June 24, 1958 N. VON RUCKER 2,839,944
TRANSMISSION CONTROL SYSTEM
Filed Aug. 3, 1955
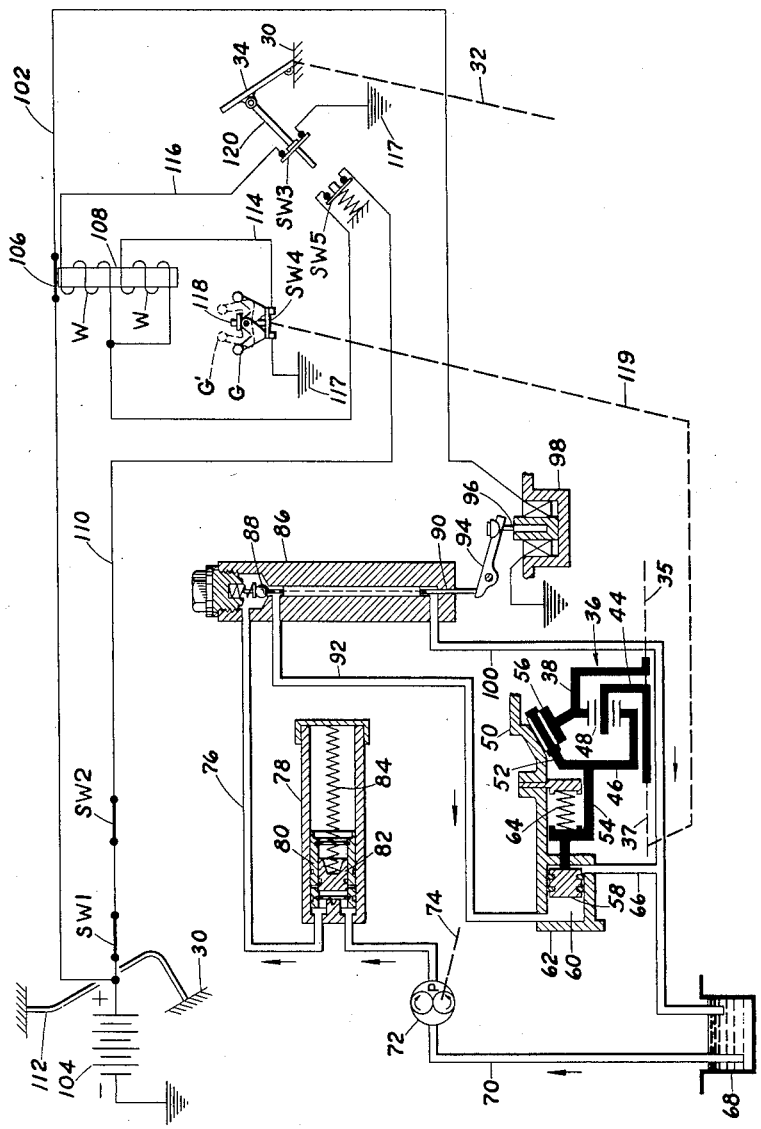
INVENTOR.
Nikolaus v. Rucker
BY
Wilson, Redrow and Sadler
ATTORNEYS.

United States Patent Office 2,839,944
Patented June 24, 1958

2,839,944

TRANSMISSION CONTROL SYSTEM

Nikolaus von Rucker, South Bend, Ind., assignor to Studebaker-Packard Corporation, Detroit, Mich., a corporation of Michigan Application August 3, 1955, Serial No. 526,256

13 Claims. (Cl. 74—472)

The present application relates to a control circuit or system for a dual speed ratio transmission, and more particularly relates to a control system for a transmission of the type which is operable to be driven as a normal drive and additionally as an overdrive, or else an underdrive and a normal drive, depending on the more readily understandable way of expressing the relationship which in either case involves a direct drive plus the other drive, however it may be expressed.

A dual speed ratio transmission drive is a convenience largely afforded as a fuel economy measure in the automotive field and the dual speed ratio aspect of this measure is principally confined to a set of planetary gearing as a source which is a mere adjunct to a main forward and reversely driving automotive transmission, usually being attached to the latter at the rear or tail shaft end thereof. The lower ratio and slower one of the dual speeds is relied upon principally for city traffic driving and for hill climbing where passby acceleration and good pickup are desired, whereas the higher ratio and faster of the dual speeds is employed in the open country and under other cruising conditions during which economy rather than pickup is at a premium.

One or more forms of commercially available so-called over-driving devices answering to the purpose of the preceding paragraph are presently offered as optional accessory equipment on several current automotive makes of domestic wheeled vehicles and common commercial form of the overdrive is accelerator pedal controlled and powered by an ignition interrupting type driving engine under control of the same accelerator pedal. Such an overdrive commonly incorporates planetary gearing having a sun gear reaction member, further having a retractable braking pawl which may be advanced to engage and hold the reaction member against rotation for providing upshift or over-drive, also having a one-way clutch causing all members in the planetary gearing including the reaction member to rotate together when kickdown (downshift) occurs as the result of the pawl being withdrawn, and further having a dash mounted drive controlled Bowden pull wire to lock-out the overdrive by means of a sun gear engaging shiftable jaw brake. A first disadvantage characterizes the transition into the condition of upshift just referred to, in that a first time delay necessarily attended by retraction by the accelerator pedal is required in order to produce a torque reversal and synchronization in the gearing in order for the pawl to be advanced to a point where it can engage and hold the sun gear. A second disadvantage characterizing the transition into the condition of kickdown, just referred to, is that a second time delay attended by ignition interruption is necessary to produce a torque reversal in the gearing in order for the pawl to be withdrawn to a point where it disengages the sun gear. A third disadvantage characterizing the overdrive operation subsequent to kickdown is that the one-way clutch permits the planetary gearing to free-wheel thus negativing any prospect to engine braking as with a positive two-way drive with which the overrun known as free-wheeling is impossible. A fourth disadvantage characterizing the Bowden wire lock-out control for the overdrive is that sometimes the jaw brake shiftable thereby, is blocked from readily engaging the sun gear and the transmission and road wheels must be forcibly rotated slightly in order to permit the jaw brake to have a free path of travel for engaging the sun gear; in any case the operation of such shiftable member by means of a Bowden pull wire may tend to become balky or require exertion and effort on the part of the operator to a degree not particularly desirable.

An object specifically for the present invention is the overcoming of the four or more foregoing disadvantages in the provision of a two-way drive device affording a positive two-way modified drive therethrough and being controlled in drive shaft in a manner whereby the first and second delays are substantially reduced or else eliminated and whereby the lock-out is accomplished by means of a simple flip switching operation rather than by the manual tugging at a Bowden cable. In the present illustrative embodiment of the invention a planetary gear set is used in conjunction with a shiftable double faced cone clutch permitting power shifting of the same, that is, a shift under power. According to one feature, the power up-shift and the power down-shift of the clutch and gear set are accomplished through the use of automatic controls preventative of jerky or inopportune lurching shifts which may otherwise tend to occur under certain conditions, for instance under the condition of deceleration.

Another object is to provide automatic circuit controls for a power shifting drive device as defined in the preceding object wherein electrical type circuits are used at least in part among the control circuit, particularly in the lock-out circuit for the device and wherein a simple flip switch may be employed in the lock-out circuit for conveniently disabling the shaft mechanism with a simple unresisted motion of the hand.

A further object of the invention is the provision of a power shifted change speed device for automobiles having a power control element and a governor element therein, in which the device has automatic controls for shifting the same for attaining higher speed as a joint function of the power control and governor elements, in which the higher speed is maintained as an individual function of either of the power control or governor elements, and in which again as a proper joint function of these two elements a shift may be made to a lower speed. According to a feature of the invention, a switch connected to the governor operates one of a pair of branch circuits through which current for controlling up-shift is carried and the other branch circuit is operated by a switch connected to the power control element. Opening of both switches causes de-energization of the pair of branches whereupon downshift occurs. The two-named switches are connected in electrically parallel branches and act to control an electromagnetic relay which in turn controls the shift mechanism for the device, preferably hydraulic shift mechanism therefor.

Another object of the invention, the same as broadly set forth in a copending application of Kamins S. N. 525,659, filed August 1, 1955, and assigned to the assignee of the present invention, is the provision of a plurality of switch controlled branch circuits for operating a wound electromagnetic relay in which at least two of the branch circuits are employed of a character no one of which is of sufficient capacity to operate the relay, and either of which is of sufficient capacity to maintain energization of the relay with proper strength in the winding or windings thereof following initial operation of the relay, and finally both are necessary to produce such initial energizing operation of the relay. The specific instant relay however, is conceived to have more than one winding as previously stated and according to the illustrative example of the invention to follow, the relay actually has a pair of windings constituting electrically parallel branch circuits. High field strength in the windings of which neither branch alone is capable of generating, is necessary to initially energize field to a tripping strength for the relay, but thereafter only a minor portion of the high field strength is necessary to hold the relay and it is noteworthy that the branch windings are each one capable of generating such minor relay holding field strength.

Within the more specific objects of the invention, the just noted principle of the high tripping strength and low holding strength of the field for proper operation of the relay is advantageously employed in that a governor switch controls one relay branch winding circuit and a power control switch controls the other such that a joint effort of the controls must be made in order to actuate or trip the relay initially.

A further object of the invention is the provision of electromagnetic switch means having only a single set of contacts but being operable in response to separate control parameters by virtue of having compound field windings each under the control of a different control parameter but together acting at the proper time to augment one another's field strengths and close the single set of contacts in the electromagnetic switch means.

Another object of the invention is to provide a set of governor actuated and throttle actuated automatic controls for a downshiftable vehicle two-way drive which on closed throttle retarded coasting of the vehicle brings into effect a governor downshift control which is so modified by a closed throttle circuit as to delay any lurch causing engagement into the downshifted speed two-way drive until at least after the vehicle retardedly coasts to a point at which the throttle will again be actuated, preferably at a point at which a full-stop is reached.

Further features, objects and advantages will either be specifically pointed out or become apparent when for a better understanding of the invention reference is made to the following written description taken in conjunction with the accompanying drawing in which the single figure shows a schematic representation of the invention applied to an automotive vehicle.

In the drawing, an automotive vehicle is fragmentarily shown having a passenger compartment 30 variously indicated at points about the body thereof and being adapted to be supported upon a wheel-suspended chassis not shown, which is also adapted to support a transmission-driving engine, not shown, in conventional fashion. The engine may be of customary design and is driver controlled through a connection at 32 by means of a heel pivoted accelerator pedal 34 mounted in the passenger compartment 30 to swing through a normal range of movement from a fully released upper position to a normally depressed wide-open throttle position, and having provision for an additional amount of kick-down over-travel below and beyond the normally depressed wide-open throttle position.

The vehicle has transmission and drive shafting which is adapted to be powered by means of the transmission driving engine thereof, and which includes a usual transmission output or tail shaft 35 and a differential-connected driven propeller shaft 37 may be provided for connecting together the transmission tail shaft 35 and the driven propeller shaft 37 in dual speed two-way positive drive.

Illustrative of one example of dual speed two-way positive drive means is a planetary gear train 36 of the type generally as shown in the noted Kamis application S. N. 525,659. The gear train 36 includes a ring gear structure 38 which is made fast to or coupled together with the transmission tail shaft 35. Further included in the gear train 36 are a planet carrier member 44 fast to the driven shaft 37, a shiftable reaction sun gear member 46, and a set of pinion members 48 preferably three or more in number which are carried by the carrier 44 and which mutually interdentally engage the sun and the ring gear members 46, 38 in orbiting meshed engagement. The shiftable reaction sun gear member 46 is rotatably mounted in a case 50 for the gear train 36 and has a pair of mutually angled apart flanges 52 and 54 fast thereto. The one flange 52 forms a double friction faced frusto conical wear member, the outer face of which is frictionally engageable with a companion frusto conical brake surface adjacent thereto on the case 50 and the inner surface of which is frictionally engageable with a companion frusto conical clutch surface 56 formed on the ring gear member 38.

As with the gear train of the Kamis application S. N. 525,659, just noted, the shiftable sun gear structure 46 of the present disclosure is axially and rotatably movable within the case 50 so as to selectively engage the brake surface of the latter to be held stationary in one shifted position or to engage the ring gear clutch face 56 and rotate therewith in another position and for this purpose of shifting, the flange 54 carried by the sun gear 46 is connected to an annular pressure movable piston 58 which is axially slidable in a toroidal chamber 60 within an annular hydraulic cylinder 62. A return spring 64 anchored to the case 50 engages the flange 54 to serve to bias the sun stationarily against the case 50. A drain line 66 is connected to the cylinder 62 so as to drain off leaked fluid from the chamber 60 thereof into a hydraulic reservoir 68. A pump supply pipe 70 connects the reservoir 68 and the intake side of a pump 72 which is driven at engine speed through a connection to the engine schematically illustrated at 74. The pump 72 supplies fluid under pressure to a pump outlet conduit 76 in which a mechanical type pressure accumulator 78 may be interposed if desired. The accumulator 78 has a cylindrical case that includes a seal carrying sleeve 80 which is slidable therein and which slidably receives for limited relative axial movement a piston 82 which opens and closes a pair of transverse passages shown in the walls of the sleeve 80 for purposes of intermittently lubricating the seals carried by the latter. The accumulator 78 is air loaded or air and spring loaded by means which may include a piston-engaging coil spring 84 that collapses as fluid accumulates in the accumulator case. The pump supplied conduit 76 is connected to a solenoid actuated plunger type valve case 86 at a location so as to communicate with a chamber therein in which a vertically movable ball check valve element 88 is located. The ball check valve 88 is spring urged downwardly into its seated position from which it may be forcibly removed upwardly by means of an actuating plunger 90 which loosely slides in a slightly oversize vertical bore in the valve case and which engages at its upper end the ball check valve element 88. Unseating of the ball check valve 88 by means of the actuating plunger 90 permits pump pressure from the pump supplied line 76 to enter a conduit 92 establishing communication between the valve case 86 and the pressurizable chamber 60 in the cylinder 62 controlling the sun gear 46. The valve plunger 90 at its lower portion engages one end of an actuating lever 94 which is pivoted on a rock shaft at its mid-portion for rocking movement. The opposite end of the lever 94 is engaged by a movable armature element 96 in a solenoid 98 which when energized draws the armature 96 downwardly and causes the plunger 90 to move oppositely vertically upwardly to open the ball check valve element 88, and pressurize the piston chamber 60. The pressure movable piston 58 thereupon causes the sun gear member 46 to shift forwardly into clutched engagement with the ring gear clutch 56 and the ring gear 38 so as to lock up the gear train 36 for 1:1 drive between the transmission tail shaft 35 and the driven shaft 37 for the differential.

On the other hand, de-energization of the solenoid 98 is attended by action of the ball check element 88 in closing, further attended by accompanying action of drainage of the pressure chamber 60 through a conduit 92 and a conduit 100 connected to the reservoir 68, and attended by appropriate shifting of the sun gear 46 under action of the return springs 64 into stationary braked engagement with the case 50 so as to provide an underdrive ratio from the ring gear 38 through the planet pinions 48 and to the carrier member 44 in relatively slow speed drive as covered in the Kamins application S. N. 525,659 already noted. The conduits 92 and 100 are restrictively interconnected in series through the slightly oversize vertical bore in the valve case 86 which as noted loosely fits the slidable actuating plunger 90 therein and thereby provides a slight radial clearance space therebetween.

It will be appreciated that under a towed start whereby the engine, not shown, is started as a result of a push on the vehicle, the pump 72 will be idle while the engine is idle and the return springs 64 will hold the sun gear 46 in its underdrive, case engaging position for conducting torque to the engine to start the same.

Novel control means may be provided for connecting the solenoid 98 to a source of energy for energizing the same.

Illustrative of one example of solenoid energizing means is an electric circuit 102 disposed between the solenoid 98 and the positive post of a negative grounded battery 104 for the vehicle and having an interposed electromagnetic relay switch 106 which is double wound to control its electromagnetically permeable iron core at 108. The double winding for the core 108 of the electromagnetic relay switch 106 comprises a pair of similarly wound coils W connected at one end to a common conductor 110 in which a pair of series conected switches SW1 and SW2 is interposed between the coils W and the battery 104. The switches SW1 and SW2 are preferably mounted to an instrument panel 112 in the passenger compartment 30, the switch SW1 constituting a key controlled ignition switch for the engine and the switch SW2 constituting a flip type overdrive lockout switch. The coils W are identical and are connected at an opposite end to different ones of a pair of electrically parallel branches 114 and 116 grounded at 117. Further in circuit with the branch 114 is a governor switch SW4 which is controlled by a governor G having a static or slow speed dotted line position shown by dotted lines G' in the drawing and having a pre-determined faster speed position shown by means of solid lines in the drawing characterized in that a governor actuated shaft and collar element 118 shifts downwardly into the solid line position to close the switch SW4.

The governor G is sensitive to vehicle speed and motion, having a connection schematically indicated at 119 usually through a gear, not shown, fast to the shaft 37. A switch SW3 is included in the branch 116 and is actuated by an actuating element 120 connected at its upper end to the accelerator pedal 34 and arranged to close the switch SW3 whenever the pedal 34 assumes its extreme upper fully released position. The actuator element 120 has a free lower extremity which in the kickdown position of the pedal 34 beyond its normal range of throttle opening movement, engages and causes a spring closed switch SW5 to open which is included in series in the conductor 110 with the key controlled and governor cutout switches SW1 and SW2. The series switches SW1, SW2, SW5 each have the same effect on the conductor 110 and the control circuit.

As already noted, the planetary gear train 36 affords a dual speed two-way positive drive between shafts 35, 37. The direct drive of the train 36, incident to the effecting of which the sun gear member 46 is clutched to the ring gear member 38 to lockup the members of the planetary train, affords the higher of the dual speed drives from the tail shaft 35 to the propeller shaft 37 whereas the underdrive or slower speed ratio is used for normal vehicle drive in which economy is not the critical item and in which the reaction sun gear 46 is braked and held stationary to provide a reduced speed ratio from the tail shaft 35 to the propeller shaft 37. The latter ratio or underdrive is automatically afforded, for instance, whenever the key controlled ignition switch SW1 is open, whenever the overdrive cutout switch SW2 is open, or whenever the kickdown switch SW5 is held open due to overdrive position of kickdown being assumed by the accelerator pedal 34 when downmost.

The high range or direct drive in the train 36 obtains whenever the actuating solenoid 98 is in its energized state which in turn depends on the circumstance that the double wound electromagnetic relay core 108 is properly energized. Owing to the fact that the field strength capacity of each of the windings W is of predeterminedly relatively low value, these similar windings W are individually incapable of energizing the field through the core 108 to a point of actuating the electromagnetic relay switch 106, having to rely solely on the potential available from the battery 104, which may be six or twelve or twenty-four volts at most; together, however, the combined current carrying capacity of the branches 114, 116 and resulting field strength of the windings W through the core 108 is jointly enough to energize and close the electromagnetically controlled switch 106 thereof to establish high ratio drive in the gear train 36. That is to say, the field generated by one winding W supplements the field of the other identical winding W.

In operation of the vehicle, the switch SW5 is normally closed, and the other two series switches SW1 and SW2 are normally closed. The governor G closes the switch SW4 in the branch 114 at a pre-determined speed preferably between or at 12 and 30 miles an hour and thereafter the vehicle operator or driver above such pre-determined speed momentarily releases the accelerator pedal 34 with his foot to close the switch SW3 and complete the branch circuit 116 to establish overdrive through the gear train 36. Each of the branches 114, 116 is sufficient thereafter for the individual winding W thereof to hold the electromagnetic relay core 108 energized sufficiently to keep the switch 106 closed according to an accepted principle whereby a relay requiring a high tripping current and field is effectively held thereafter merely by a low holding current and field created thereby. Accordingly, the accelerator pedal 34 may immediately, after release above the pre-determined speed setting of the governor, be restored by the driver to an operating position within its normal range of travel.

Downshifting from direct drive to underdrive can be accomplished, firstly, by depressing the accelerator pedal 36 to the overtravel position of kickdown causing the spring returned kickdown switch SW5 to open, secondly, by touching the accelerator pedal 34 after reaching a full closed-throttle coast stop prior to which the governor G automatically opens at its pre-determined cutout speed, thirdly, by interrupting the circuit by opening the key controlled ignition switch SW1, fourthly, by flipping open the manual cutout switch SW2 and, fifthly by holding part throttle with the accelerator pedal 34 within its normal range of movement at a time at which the vehicle is retarded and decelerates to below the pre-determined cutout speed of the governor G.

It will be appreciated that during upshift into direct drive of the gear train 36, the release of the accelerator pedal 34 above governor cut-in speed is only momentary so as to close the switch in the branch 116 and that thereafter throttle operation may be resumed without waiting for the attendant torque reversal for overdrive in the overdrive train as with the conventional overdrives. The fact is to be recognized that kickdown into underdrive ratio is accomplished instantaneously with downward overtravel of the accelerator pedal beyond its normal range of movement so as to open the kickdown switch SW5 and that no ignition interruption or other delay for torque reversal is necessary as with conventional overdrives. In spite of the advantage of the presently disclosed embodiment of the invention in providing positive two-way two-ratio drives without free-wheeling in any ratio, it will be further appreciated that there is no offsetting disadvantage of vehicle lurch when slowing to a stop with a closed throttle, inasmuch as no change speed shift to underdrive occurs under normal operation until the time at which the throttle controlling pedal 34 is again depressed, presumably after coming to a full stop. The ease and convenience is apparent with use of the simple expedient of a flip type manual switch SW2 on the instrument panel 112 for cutting out the overdrive when the overdrive (direct drive) operation is not desired.

The foregoing advantages are directly attributable to the novel arrangement of the three series connected switches SW1, SW2 and SW5, and to the novel parallel connected switches SW4 and SW3 of which the former is automatically controlled by governor mechanism at governor cut-in and cutout pre-determined speeds and of which the latter is controlled by the driver operable accelerator pedal mechanism 120. The parallel switch controlled coil windings W each have the same effect on the relay switch 106 and the balance of the control circuit.

As herein disclosed the present control invention is shown embodied in an arrangement with a two-speed overdrive system which mechanically employs an underdrive for the low ratio speed and a direct drive for the higher (1:1) ratio speed. It is evident that with a minor reversal of parts and with an opposite direction of drive of the mechanism direct power paths, the system may be made to operate in 1:1 ratio for lower speed and to operate as an actual overdrive for the higher ratio speed. So also the drawing shows an electrically actuated system combined with a hydraulic shifting system but self-evidently an all elecrical, an all hydraulic, or conceivably by an all pneumatic system of known servo capacity can be similarly advantageously employed or else various combinations thereof employed as desired.

Variations within the spirit and scope of the invention described are equally comprehended by the foregoing description. Finally, in the foregoing description, certain terms have been used for brevity, clearness, and understanding; but no unnecessary limitations are to be implied therefrom beyond the requirements of the prior art, because such terms are used for descriptive purposes herein and not for the purpose of limitation and are intended to be broadly construed.

What is claimed is:

1. In a motor vehicle, a power control pedal, a transmission mechanism controlling means operable to establish a modified speed drive, and an electromagnetic system including a relay with double windings arranged to supplement one another and a solenoid having actuation thereof effected by the relay under its full strength to effect actuation of said controlling means, a source of electrical energy for said windings having a predetermined potential, and a switch in circuit with each relay winding and being sequentially operable relative to the other switch for cumulatively but not separately building up full strength in the relay windings to cause energization of the solenoid to effect actuation of said controlling means.

2. In a motor vehicle, a power control pedal, a transmission mechanism controlling means operable to establish a modified speed drive, and an electromagnetic system including a relay with double windings arranged to supplement one another and a solenoid energizable upon actuation of the relay under its full strength to effect actuation of said controlling means, a source of electrical energy of said windings having a predetermined potential, a switch in circuit with each relay winding and being sequentially operable relative to the other switch for cumulatively but not separately building up full strength in the relay windings to cause energization of the solenoid for actuating said controlling means, and in combination therewith, switch means operable by the power control pedal to control said electromagnetic system.

3. In a motor vehicle having a passenger compartment provided with an accelerator pedal element and having a governor provided with a speed sensing element, control means having a member operable to establish two driving speed ratios in a power transmission mechanism comprising an electromagnetic circuit including a double wound relay and a solenoid, a source of electrical energy for double windings of said relay having a predetermined potential actuator means for said member responsive to said solenoid, a switch in the circuit operable by the accelerator pedal element in the passenger compartment, and a governor controlled switch connected to said governor element and operated in accordance with a pre-determined vehicle speed, said switches being arranged in parallel and individually operative to produce the same holding effect on the relay but being operative to produce an initiating effect thereon only as a joint effort.

4. In a motor vehicle having a passenger compartment provided with an accelerator pedal element and having a governor provided with a speed sensing element, control means having a member operable to establish two driving speed ratios in a power transmission mechanism comprising an electromagnetic circuit including a double wound relay and a solenoid having actuation thereof effected by said relay, source of electrical energy for the double windings of said relay having a predetermined potential, actuator means for said member responsive to said solenoid, a switch in circuit with one of the relay windings and operable by the accelerator pedal element in the passenger compartment, and a governor controlled switch in circuit with the other relay winding and connected to said governor element, said switches and windings being arranged in parallel and being individually operative to produce the same holding effect on the relay but being operative to produce an initiating effect thereon only as a joint effort.

5. In a motor vehicle transmission having gearing including a rotatable reaction member shiftable into frictional engagement in each of opposite positions, a control system including electromagnetic means for shifting said member comprising electromagnetic parallel branch coils in the system, source of electrical energy for said coils having a predetermined potential, a switch in circuit with each coil and operable in combination with the other branch to energize said electromagnetic means and either one being effective thereafter to maintain effective energization of the same, and separate means for operating said switches and effective to open them both to deenergize said electromagnetic means, one of said separate means comprising automatic mechanism, another of said separate means comprising driver operable mechanism that also includes an additional switch which in one position thereof is effective to disable said system.

6. In a control system, an electromagnetic relay incorporating energizable coil means having two windings for electromagnetically actuating the same, a solenoid having actuation thereof effected by the relay, said relay having switch containing parallel branches associated in the system therewith for jointly conducting energy thereto to actuate the same, a source of electrical energy for said branches having a predetermined potential, and each branch being effective thereafter while its switch is closed to maintain sufficient field strength in the coil means for the latter to hold but not actuate said relay, and separate means for operating said switches and effective to open them both to deenergize the coil means and deactivate the relay.

7. In a control system, an electromagnetic relay incorporating energizable coil means having two windings for electromagnetically actuating the same, a solenoid having actuation thereof effected by the relay, said relay having switch containing parallel branches associated in the system therewith for jointly conducting energy thereto to actuate the same, a source of electrical energy for said branches having a predetermined potential, and each branch being effective thereafter while its switch is closed to maintain sufficient field strength in the coil means for the latter to hold but not actuate said relay, and separate means for operating said switches and effective to open them both to deenergize the coil means and deactivate the relay, one of said separate means comprising automatic mechanism, another of said separate means comprising manually operable mechanism that also includes an additional switch which in one position thereof is effective to disable said system.

8. In a control system, an electromagnetic relay incorporating energizable double windings for actuating the same, a solenoid having actuation thereof effected by the relay, said relay having switch containing parallel branches connected with different ones of said windings in the system for jointly conducting energy to the relay windings to actuate the relay with each branch being effective thereafter to maintain sufficient field strength in its winding for the latter to hold but not actuate said relay, a source of electrical energy for said branches having a predetermined potential, and separate means of operating said switches and effective to open them to deenergize the coil windings and release said relay.

9. In a control system, an electromagnetic relay incorporating energizable double winding means for actuating the same, a solenoid having actuation thereof effected by the relay, said relay having switch containing parallel branches associated in the system therewith for jointly conducting energy to the energizable winding means of the relay to actuate the same, a source of electrical energy for said branches having a predetermined potential, and each branch being effective thereafter while the switch is closed to maintain sufficient field strength through the winding means to hold but not actuate said relay, and separate means for operating said switches and effective to open them to de-energize the winding means and deactivate the solenoid operating relay.

10. In a motor vehicle, a power control pedal, a speed responsive device, a transmission mechanism and controlling means therefor for establishing a modified speed drive, first circuit means including a source of electrical energy and a relay to effect operation of said controlling means, second circuit means including a source of electrical energy with a predetermined potential and two parallel branches, two windings for said relay respectively disposed in said branches, a switch in each of said branches, said branches having a joint capacity with respect to said potential to effect actuation of said relay and the singular capacity to only hold said relay in an actuated position.

11. In a motor vehicle, a power control pedal, a speed responsive device, a transmission mechanism and controlling means therefor for establishing a modified speed drive, first circuit means including a source of electrical energy and a relay to effect operation of said controlling means, second circuit means including a source of electrical energy with a predetermined potential and a series portion and two parallel branches, two windings for said relay respectively disposed in said branches, a switch in one of said branches operated by said pedal and a switch in said other branch operated by said speed responsive device, switch means in said series portion operated by said pedal, said branches having a joint capacity with respect to said potential to effect actuation of said relay and the singular capacity to only hold said relay in an actuated position.

12. In a motor vehicle, a power control pedal, a speed responsive device, a transmission mechanism and controlling means therefor including a solenoid for establishing a modified speed drive, first circuit means including a source of electrical energy and a relay to effect operation of said solenoid, second circuit means including a source of electrical energy with a predetermined potential and a series portion and two parallel branches, two windings for said relay respectively disposed in said branches, a switch in one of said branches operated by said pedal and a switch in said other branch operated by said speed responsive device, switch means in said series portion operated by said pedal, said branches having a joint capacity with respect to said potential to effect actuation of said relay and the singular capacity to only hold said relay in an actuated position.

13. In a motor vehicle, a power control pedal, a speed responsive device, a transmission mechanism and controlling means therefor for establishing a modified speed drive, first circuit means including a source of electrical energy and a relay to effect operation of said controlling means, second circuit means including a source of electrical energy with a predetermined potential and a series portion and two parallel branches, two windings for said relay respectively disposed in said branches, a switch in each of said branches, switch means in said series portion, said branches having a joint capacity with respect to said potential to effect actuation of said relay and the singular capacity to only hold said relay in an actuated position.

References Cited in the file of this patent

UNITED STATES PATENTS 2,306,865     Claytor _____ Dec. 29, 1942